US011877163B2

(12) United States Patent
Yu et al.

(10) Patent No.: US 11,877,163 B2
(45) Date of Patent: Jan. 16, 2024

(54) SYSTEMS AND METHODS FOR OPERATING RADIO ACCESS NETWORKS WITH HIGH SERVICE AVAILABILITY

(71) Applicant: DISH Wireless L.L.C., Englewood, CO (US)

(72) Inventors: Frank Tao Yu, Broadlands, VA (US); Farhad Bassirat, Arlington, VA (US)

(73) Assignee: DISH Wireless L.L.C., Englewood, CO (US)

( * ) Notice: Subject to any disclaimer, the term of this patent is extended or adjusted under 35 U.S.C. 154(b) by 22 days.

(21) Appl. No.: 17/705,128

(22) Filed: Mar. 25, 2022

(65) Prior Publication Data

US 2023/0308902 A1    Sep. 28, 2023

(51) Int. Cl.
*H04W 24/02* (2009.01)
*H04W 76/10* (2018.01)
*H04W 52/02* (2009.01)
*H04W 84/04* (2009.01)

(52) U.S. Cl.
CPC ....... *H04W 24/02* (2013.01); *H04W 52/0212* (2013.01); *H04W 76/10* (2018.02); *H04W 84/04* (2013.01)

(58) Field of Classification Search
CPC . H04W 24/02; H04W 76/10; H04W 52/0212; H04W 84/04
USPC .......................................................... 709/220
See application file for complete search history.

(56) References Cited

U.S. PATENT DOCUMENTS

| 2015/0195723 | A1  | 7/2015  | Park |
|---|---|---|---|
| 2016/0013550 | A1  | 1/2016  | Artemenko et al. |
| 2017/0331577 | A1* | 11/2017 | Parkvall ............... H04J 11/0079 |
| 2017/0331670 | A1* | 11/2017 | Parkvall .............. H04L 41/0816 |
| 2018/0242355 | A1* | 8/2018  | Lou ....................... H04W 74/006 |
| 2019/0124577 | A1* | 4/2019  | Li ........................... H04L 41/40 |
| 2019/0150220 | A1  | 5/2019  | Byun et al. |

(Continued)

FOREIGN PATENT DOCUMENTS

KR    10-2019-0091866 A    8/2019

OTHER PUBLICATIONS

Anonymous: "O-RAN Alliance Working Group 4; Management Plane Specification v05.00 O-RAN.WG4.MP.0-v05.00", Feb. 28, 2021, pp. 1-102.

(Continued)

*Primary Examiner* — Tauqir Hussain
(74) *Attorney, Agent, or Firm* — Jeremiah J. Baunach; VLP Law Group LLP

(57) ABSTRACT

Disclosed is a method of operating a Radio Access Network (RAN) including a Radio Unit (RU), a first Distributed Unit (DU), a second DU that functions as a dynamic standby DU, and a network management device. After the RU transmits data to the first DU using a configuration parameter set to an address of the first DU, the RU detects an outage of the first DU. In response to detecting the outage, the RU transmits to the network management device a message indicating detection of the outage. In response, the network management device configures the second DU to perform the functions of the first DU, and causes the second DU to request the RU to set the configuration parameter to an address of the second DU. The RU then uses the configuration parameter set to the address of the second DU to transmit data to the second DU.

11 Claims, 8 Drawing Sheets

(56) References Cited

U.S. PATENT DOCUMENTS

| | | | |
|---|---|---|---|
| 2019/0245740 A1 | 8/2019 | Kachhla | |
| 2020/0204252 A1 | 6/2020 | Barbieri et al. | |
| 2020/0351786 A1* | 11/2020 | Koskela | H04W 52/0235 |
| 2021/0029025 A1* | 1/2021 | Abedini | H04L 45/306 |
| 2021/0176658 A1 | 6/2021 | Wang et al. | |
| 2021/0266764 A1 | 8/2021 | Khanfouci et al. | |
| 2021/0352132 A1* | 11/2021 | Nix | H04L 9/3247 |
| 2022/0014326 A1* | 1/2022 | Lourdu Raja | H04L 5/0048 |
| 2022/0167449 A1* | 5/2022 | Wang | H04L 5/001 |
| 2022/0272594 A1* | 8/2022 | Anderson | H04W 36/165 |
| 2022/0286910 A1* | 9/2022 | Ramakrishnan | H04W 48/08 |
| 2022/0295444 A1* | 9/2022 | Wu | H04L 5/0053 |
| 2022/0353775 A1* | 11/2022 | Wager | H04W 36/305 |
| 2023/0050355 A1* | 2/2023 | Laselva | H04W 52/0235 |
| 2023/0088205 A1* | 3/2023 | Lourdu Raja | H04L 5/0048 370/329 |
| 2023/0156591 A1* | 5/2023 | Abedini | H04W 72/046 370/318 |

OTHER PUBLICATIONS

Fujitsu: "Discussion on IP-based tunnel between IAB-donor-Dus", 3GPP Draft; R3-214870, 3rd Generation Partnership Project (3GPP), Mobile Competence Centre, vol. RAN WG3, No. electronic, Oct. 22, 2021.

International Search Report and Written Opinion received for PCT Patent Application No. PCT/US2023/013255, dated Jun. 9, 2023, 11 pages.

International Search Report and Written Opinion received for PCT Patent Application No. PCT/US2023/013256, dated May 26, 2023 14 pages.

Jordan Eugina: "Open RAN functional splits, explained", Retrieved from https://www.5gtechnologyworld.com/open-ran-functional-splits-explained, Feb. 24, 2021.

LG UPLUS: "Consideration of Digital Unit redundancy in LTE based railway systems", 3GPP Draft; S6-191318, vol. SA WG6, No. Roma, Jul. 1, 2019.

* cited by examiner

FIG. 8A

| 302-11 | ← DU-STANDBY |
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← DU#3 |
| 302-2 | ← DU#2 |
| 302-1 | ← DU#1 |

FIG. 8B

| 302-11 | ← DU#1 |
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← DU#3 |
| 302-2 | ← DU#2 |
| 302-1 | ← OUTAGE |

FIG. 8C

| 302-11 | ← DU#1 |
| 302-10 | ← DU#10 |
| 302-9 | ← DU#9 |
| 302-8 | ← DU#8 |
| 302-7 | ← DU#7 |
| 302-6 | ← DU#6 |
| 302-5 | ← DU#5 |
| 302-4 | ← DU#4 |
| 302-3 | ← DU#3 |
| 302-2 | ← DU#2 |
| 302-1 | ← DU-STANDBY |

SYSTEMS AND METHODS FOR OPERATING RADIO ACCESS NETWORKS WITH HIGH SERVICE AVAILABILITY

BACKGROUND

Technical Field

The present disclosure relates generally to wireless cellular telecommunications, more particularly, to Radio Access Networks (RANs) with high service availability.

BRIEF SUMMARY

5G Networks typically include a Core Network (Core) that coordinate operations of a Radio Access Network (RAN), which provides network services to end user devices such as smartphones and sensors. The Core Network (Core) may be implemented in a cloud computing environment by virtual servers that communicate with computing devices located at a local data center (LDC) that are configured as Distributed Unit (DU) devices, each of which provides network services to a group of associated Radio Unit (RU) devices located at a cell site. When a computing device that functions as a DU device has an outage, the computing device is not able to perform the functions of the DU device that provides network services to the associated RU devices. Accordingly, end user devices in a vicinity of the cell site where the associated RU devices are located experience service interruptions until the DU device no longer has the outage.

In order to solve such a technical problem, the present disclosure teaches using a standby Distributed Unit (DU) device that can be rapidly and dynamically reconfigured to take over functions of a DU device that is experiencing an outage. For example, a Radio Access Network (RAN) includes a Radio Unit (RU) device, a first DU device, a second DU device that functions as a dynamic standby DU, and a network management device. After the RU device transmits data to the first DU using a configuration parameter set to an address of the first DU device, the RU device detects an outage of the first DU device. In response to detecting the outage, the RU device transmits to the network management device a message indicating detection of the outage. In response, the network management device causes the second DU device to be reconfigured to perform the functions of the first DU device, and causes the second DU device to request the RU device to set the configuration parameter to an address of the second DU device. The RU device then uses the configuration parameter set to the address of the second DU device to transmit data to the second DU device. Accordingly, network service downtime is significantly reduced compared to conventional techniques that rely on network technicians to manually respond to outages of devices that provide network services. Thus, network service availability is significantly improved compared to conventional techniques for responding to outages of devices that provide network services.

A method of operating a Radio Access Network (RAN), which includes a radio unit device, a first computing device, and a second computing device different from the first computing device, according to the present disclosure may be summarized as including: transmitting, by the radio unit device, first data to the first computing device using a configuration parameter of the radio unit device having a value set to an address of the first computing device; detecting, by the radio unit device, an outage of the first computing device; transmitting, by the radio unit device, a message indicating detection of the outage of the first computing device in response to the detecting the outage of the first computing device; receiving, by the radio unit device, a request to modify the value of the configuration parameter of the radio unit device from the address of the first computing device to an address of the second computing device; and transmitting, by radio unit device, second data to the second computing device using the configuration parameter of the radio unit device having the value set to the address of the second computing device.

The method may further include: establishing, by the radio unit device, a first Network Configuration (NETCONF) protocol session with the first computing device; and establishing, by the radio unit device, a second NETCONF protocol session with the second computing device.

The method may further include: stopping, by the radio unit device, transmission by a radio frequency transmitter of the radio unit device in response to the detecting the outage of the first computing device.

The detecting the outage of the first computing device may include detecting, by the radio unit device, expiration of a timer.

The method may further include: transmitting, by the first computing device, a message that resets the timer.

The method may further include: receiving, by the second computing device, Distributed Unit (DU) configuration information including an address of the radio unit device; and transmitting, by the second computing device, the request to modify the value of the configuration parameter of the radio unit device using the address of the radio unit device included in the DU configuration information.

A method of operating a Radio Access Network (RAN), which includes a radio unit device, a first computing device, and a second computing device different from the first computing device, according to the present disclosure may be summarized as including: storing, by a network management device, first Distributed Unit (DU) configuration information; configuring, by the network management device, the first computing device using the first DU configuration information; detecting, by the network management device, an outage of the first computing device; configuring, by the network management device, the second computing device using the first DU configuration information in response to the detecting the outage of the first computing device; and causing, by the network management device, the second computing device to update a configuration parameter stored by the radio unit device using an address of the radio unit device included in the first DU configuration information.

The detecting the outage of the first computing device may include receiving a message from the radio unit device.

The method may further include: storing, by the network management device, second DU configuration information different from the first DU configuration information; and configuring, by the network management device, the second computing device using the second DU configuration information before the configuring the second computing device using the first DU configuration information.

The method may further include: causing, by the network management device, the second computing device to enter a power saving mode after the configuring the second computing device using the second DU configuration information; and causing, by the network management device, the second computing device to exit the power saving mode before the configuring the second computing device using the first DU configuration information.

The method may further include: receiving, by the network management device, the first DU configuration information from the first computing device.

The method may further include: causing, by the network management device, the first computing device to transmit the first DU configuration information to the network management device.

The method may further include: establishing, by the network management device, a first Network Configuration (NETCONF) protocol session with the second computing device; configuring, by the network management device, the second computing device using second DU configuration information different from the first DU configuration information during the first NETCONF protocol session; and establishing, by the network management device, a second NETCONF protocol session with the first computing device, wherein the configuring the first computing device using the first DU configuration information is performed during the second NETCONF protocol session.

A network management system that manages a Radio Access Network (RAN), which includes a radio unit device, a first computing device, and a second computing device different from the first computing device, according to the present disclosure may be summarized as including: one or more processors; and one or more storage devices storing instructions that, when executed by the one or more processors, cause the network management system to: configure the first computing device using first Distributed Unit (DU) configuration information; detect an outage of the first computing device; configure the second computing device using the first DU configuration information in response to the detecting the outage of the first computing device; and cause the second computing device to update a configuration parameter stored by the radio unit device using an address of the radio unit device included in the first DU configuration information.

The instructions stored by the one or more storage devices, when executed by the one or more processors, may cause the network management system to cause the first computing device to detect the outage of the first computing device in response to receiving a message from the radio unit device.

The instructions stored by the one or more storage devices, when executed by the one or more processors, may cause the network management system to: configure the second computing device using second DU configuration information different from the first DU configuration information before the second computing device is configured using the first DU configuration information.

The instructions stored by the one or more storage devices, when executed by the one or more processors, may cause the network management system to: cause the second computing device to enter a power saving mode after the second computing device is configured using the second DU configuration information; and cause the second computing device to exit the power saving mode before the second computing device is configured using the first DU configuration information.

The instructions stored by the one or more storage devices, when executed by the one or more processors, may cause the network management system to: receive the first DU configuration information from the first computing device.

The instructions stored by the one or more storage devices, when executed by the one or more processors, may cause the network management system to: cause the first computing device to transmit the first DU configuration information to the network management system.

The instructions stored by the one or more storage devices, when executed by the one or more processors, may cause the network management system to: establish a first Network Configuration (NETCONF) protocol session with the second computing device; configure the second computing device using second DU configuration information different from the first DU configuration information during the first NETCONF protocol session; and establish a second NETCONF protocol session with the first computing device, wherein the first computing device is configured using the first DU configuration information during the second NETCONF protocol session.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present disclosure, reference will be made to the following Detailed Description, which is to be read in association with the accompanying drawings:

FIGS. 8A to 8C are diagrams for explaining an example of operating a Radio Access Network (RAN) in accordance with embodiments described herein.

DETAILED DESCRIPTION

Figure 1:
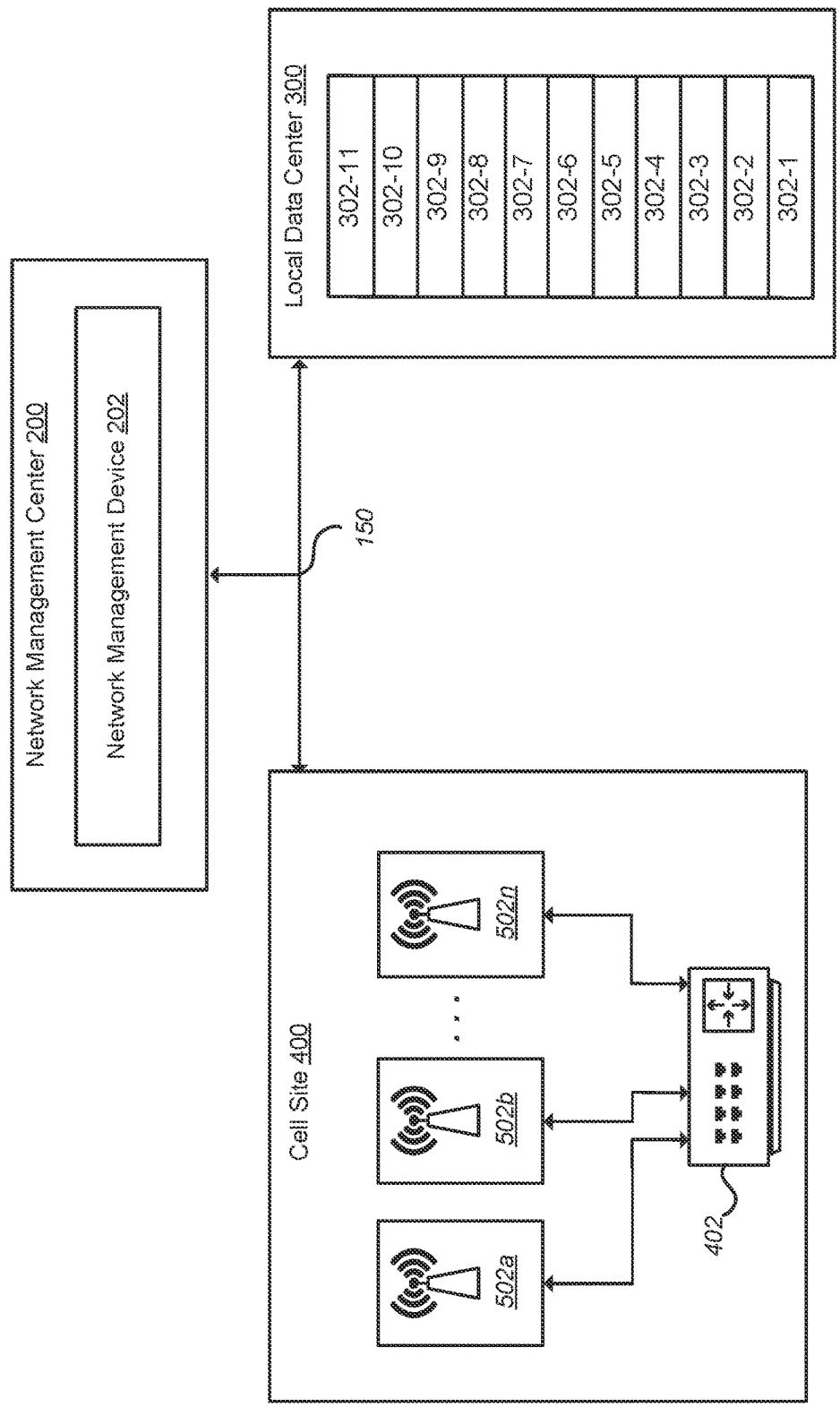
FIG. 1 is a block diagram illustrating a system including a network management device, a plurality of computing devices that can be configured to operate as Distributed Unit (DU) devices, a Cellular Site Router (CSR) device, and a plurality of Radio Unit (RU) devices in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

The present disclosure teaches systems and methods for enhancing service availability through implementation of a dynamic standby Distributed Unit (DU) device in a local data center (LDC), which can save deployment costs. By having a primary and a standby DU architecture, service interruptions can be avoided or minimized when a server of a DU device crashes at a LDC. Such systems and methods cannot be realized in a traditional Remote Radio Unit (RRU) device and Baseband Unit (BBU) device structure, because to connections between RRU and BBU devices is implemented in static Common Public Radio Interface (CPRI).

The Open Radio Access Network (O-RAN) ALLIANCE has an O-RAN Fronthaul Working Group that has published a Control, User and Synchronization Plane Specification (e.g., O-RAN.WG4.CUS.0-v07.00). Section 3.4 of the specification recites, in part, "In addition, O-RU data flows can be switched/routed to different O-DUs (or different O-DU ports or O-DU processors) according to the transport-based identifiers associated with an eAxCid (referred to as processing-elements in the WG4 M-Plane Specification) to allow frames/packets to be switched/routed by network equipment with no visibility of the eAxC values carried in the eCPRI/1914.3 header." However, the specification does not disclose a system level design to implement switching/routing of O-RU data flows to different O-DUs. Moreover, the specification does not disclose use of O-DU redundancy to restore service when one O-DU crashes. Accordingly, network services provided by an O-DU device that is experiencing an outage are not available until the outage is remedied. For example, network services provided by an O-DU device that is experiencing an outage are not available until the O-DU device is rebooted, or hardware of the O-DU device is repaired or replaced. The present disclosure teaches deploying one or more dynamic mirror O-DU devices at a LDC to provide service to Radio Unit (RU) devices when one of the O-DU devices that is currently serving those RU device has an issue that causes service outages.

In a typical cloud-based wireless network structure, a LDC accommodates a certain number of O-DU devices to serve O-RU devices at cell sites that are within in a 20 to 40 kilometer radius of the LDC. The present disclosure teaches systems and methods for providing O-DU service availability optimization to avoid service interruptions when one or more O-DU device has one or more critical issues cause one or more service outages, which can provide better end user experiences.

According to the present disclosure, a total number of DU devices deployed in an LDC may be n+1, where n DU devices are required to provide services to RU devices that are supported by the LDC, and 1 is the number of backup DU devices. In some implementations, x is the number of backup DU devices included in an LDC, where x is greater than one. For example, an LDC that is located in a high-priority geographical area (e.g., New York City area) may include n DU devices that provide network services to RU devices, and x standby DU devices that can be rapidly reconfigured to take over for any of the n DU devices if those devices experience an outage.

A Network Management System (NMS) includes at least one network management device that performs Element Management System (EMS) functions, Service Management and Orchestration (SMO) functions, and Service Orchestrator (SO) functions that enable it to keep an inventory of DU devices in each LDC. Thus, the network management device performing the EMS/SMO/SO functions is aware that one or more backup DU devices are available at the LDC. Each backup DU device is instantiated in the LDC, and F1, E2, and O1 interfaces of the backup DU device are established so that the backup DU device can quickly start providing services when needed. Because each backup DU device does not have any RU devices connected to it, the network management device performing the EMS/SMO/SO functions can set the DU device in a power saving mode, for example, using a cloud platform such as VMWare. In one or more implementations, the network management device performing the EMS/SMO/SO functions performs Connection Management (CM), lifecycle management (LCM), and Cloud-Native Functions (CNFs) related to inventory and resource management.

When a RU device detects an outage of a DU device, the RU device notifies the network management device performing the EMS/SMO/SO functions. In one or more implementations, the RU device detects an outage of a DU device by detecting a NETCONF supervision failure with "sudo" privileges by a NETCONF client running on a connected DU device, the RU device immediately ceases radio frequency (RF) transmission. In one or more implementations, the RU device performs an autonomous recovery reset procedure, as defined in O-RAN M-Plane specification and, if there are available backup DU devices in an LDC, the network management device performing the EMS/SMO/SO functions instructs an available backup DU device to set up a NETCONF protocol session with the RU device after the RU device initiates a "start up" procedure. In one or more implementations, the RU device does not perform an autonomous recovery reset procedure and, if there are available backup DU devices in an LDC, the network management device performing the EMS/SMO/SO functions instructs an available backup DU device to set up a NET-CONF protocol session to restore service to the RU device.

For example, when an issue occurs with a DU device that provides services to RU devices such that the DU device has an outage, the network management device performing the EMS/SMO/SO functions clones and/or configures a backup DU device using saved configuration information that was previously used to configure the DU device having the outage, including RU device mapping information that includes IP addresses of RU devices to which the DU device having the outage is configured to provide network services. The backup DU device obtains RU device information from the configuration information, including IP addresses of the RU devices, and uses that information to initiate NETCONF protocol sessions to all of the RU devices previously controlled by the DU device having the outage in order to set up an M-plane, and then establish a CU plane after the M-plane is set up.

FIG. 1 is a block diagram illustrating a network system 100 in accordance with embodiments described herein. A network management center 200 includes a network management device 202 which can monitor the operational status, configure software on, and remotely execute programs on various devices in the network system 100. In one or more implementations, the network management device 202 is part of a Core Network (Core) and is implemented in a cloud computing environment by one or more virtual servers.

A local data center (LDC) 300 includes a plurality of computing devices 302-1 to 302-11 that can be configured to operate as Distributed Unit (DU) devices. In one or more implementations, the functionality of the Distributed Unit (DU) devices is defined in technical specifications provided by the Open Radio Access Network (O-RAN) Alliance. Although the local data center (LDC) 300 shown in FIG. 1 includes eleven computing devices, the local data center (LDC) 300 may include a greater number or a smaller number of computing devices without departing from the scope of the present disclosure.

A cell site 400 includes a Cellular Site Router (CSR) device 402 that is coupled to a plurality of Radio Unit (RU) devices 502a to 502n using a plurality of cabled connections. In one or more implementations, the Cellular Site Router (CSR) device 402 is coupled to six Radio Unit (RU) devices. The Cellular Site Router (CSR) device 402 and the Radio Unit (RU) devices 502a to 502n communicate with the computing devices 302-1 to 302-11 and the network management device 202 using a fronthaul interface network 150. In one or more implementations, the functionality of the Cellular Site Router (CSR) device 402 and the Radio Unit (RU) devices 502a to 502n is defined in technical specifications provided by the Open Radio Access Network (O-RAN) Alliance. For illustrative simplicity, only one cell site is shown in FIG. 1; however, the fronthaul interface network 150 may connect the computing devices 302-1 to 302-11 in the local data center (LDC) 300 with a plurality of cell sites, for example, within a radius of 20 kilometers of the local data center (LDC) 300.

The Cellular Site Router (CSR) device 402 and the Radio Unit (RU) devices 502a to 502n are part of a Radio Access Network (RAN). The Radio Access Network (RAN) is the final link between the network system 100 and end user devices such as mobile phones or other connected device. It includes the antennae seen on cellular telecommunications towers, on top of buildings or in stadia, plus the base stations. When a cellular telephone call is made or a connection to a remote server is made, the antenna transmits and receives signals to and from the cellular telephone phones or other connected devices, e.g., Internet-of-Things (IoT) devices. The signal is then digitalized in the RAN base station and connected into the network.

The Core Network (Core) has many functions. It provides access controls ensuring users are authenticated for the services they are using, it routes telephone calls over the public-switched telephone network, it enables operators to charge for calls and data use, and it connects users to the rest of the world via the Internet. It also controls the network by making handovers happen as a user moves from coverage provided by one RAN tower to the next.

In an Open RAN environment, the Radio Access Network (RAN) is disaggregated into three main building blocks: Radio Unit (RU) devices, Distributed Unit (DU) devices, and Centralized Unit (CU) devices. Each Radio Unit (RU) device, such as Radio Unit (RU) devices 502a to 502n of FIG. 1, is located at a cellular telecommunications tower base station where the radio frequency signals are transmitted, received, amplified and digitized. Each Radio Unit (RU) is located near, or integrated into, the antennas of the cellular telecommunications tower. Each cellular telecommunications tower may have multiple (e.g., 3 or 6) Radio Unit (RU) devices to fully service a particular coverage area.

Each Distributed Unit (DU) is configured to perform computations and provide network services to a group of Radio Unit (RU) devices and the Centralized Unit (CU). For example, the computing device 302-1 may be configured to operate as a first Distributed Unit (DU) DU #1 that receives the digitialized radio signal from the Radio Unit (RU) devices 502a to 502n via the Cellular Site Router (CSR) device 402 that routes traffic from the Radio Unit (RU) devices 502a to 502n to the Distributed Unit (DU) DU #1, and send the digitialized radio signal into the network system 100. The computing devices configured to operate as Distributed Unit (DU) devices are physically located at the local data center (LDC) 300, which is located near the RUs. The Centralized Unit (CU) can be located nearer the Core Network (Core).

One key concept of Open RAN is "open" protocols and interfaces between these various building blocks (i.e., Radio Unit (RU) devices, Distributed Unit (DU) devices, and Centralized Unit (CU) devices). Another key concept of Open RAN is using commercial off-the-shelf (COTS) equipment for each of the devices in the network. The O-RAN Alliance has defined at least 11 different interfaces within the Radio Access Network (RAN) including those for: Fronthaul between the Radio Unit (RU) devices and the associated Distributed Unit (DU), Midhaul between the Distributed Unit (DU) and the Centralized Unit (CU), and Backhaul connecting the Radio Access Network (RAN) to the Core Network (Core).

Figure 2:
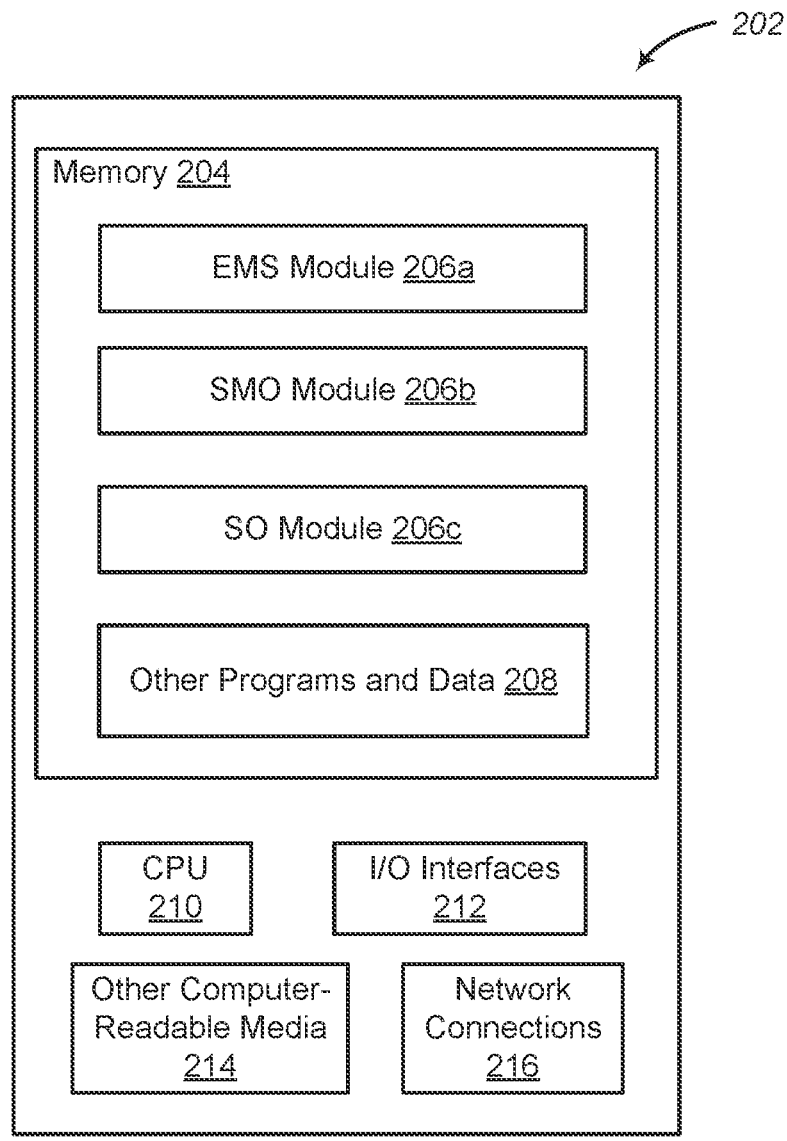
FIG. 2 is a block diagram illustrating a computing device that is configured to operate as a network management device in accordance with embodiments described herein.

FIG. 2 is a block diagram illustrating a computing device that is configured to operate as a network management device 202 in accordance with embodiments described herein. In some embodiments, one or more special-purpose computing systems may be used to implement the network management device 202. Accordingly, various embodiments described herein may be implemented in software, hardware, firmware, or in some combination thereof. The network management device 202 may include one or more memory devices 204, one or more central processing units (CPUs) 210, I/O interfaces 212, other computer-readable media 214, and network connections 216.

The one or more memory devices 204 may include one or more various types of non-volatile and/or volatile storage technologies. Examples of the one or more memory devices 204 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 204 may be utilized to store information, including computer-readable instructions that are utilized by the one or more CPUs 210 to perform actions, including those of the embodiments described herein.

The one or more memory devices 204 may have stored thereon an Element Management System (EMS) module 206a, a Service Management and Orchestration (SMO) module 206b, and a Service Orchestrator (SO) module 206c. The Element Management System (EMS) module 206a, a Service Management and Orchestration (SMO) module 206b, and a Service Orchestrator (SO) module 206c are configured to implement and/or perform some or all of the functions of the network management device 202 described herein. The one or more memory devices 204 may also store other programs and data 208, which may include DHCP server functions, connection recovery algorithms, connection recovery rules, network protocols, O-RAN operating rules, user interfaces, operating systems, etc.

Network connections 216 are configured to communicate with other computing devices including the Cellular Site Router (CSR) device 402, and the Radio Unit (RU) devices 502a to 502, and the computing devices 302-1 to 302-11. In various embodiments, the network connections 216 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/ transparent bridge in order to support Radio Unit (RU) copy and combine function for O-RAN cascade mode. I/O interfaces 212 may include a video/display interface, Peripheral Component Interconnect (PCI), other data input or output interfaces, or the like. Other computer-readable media 214 may include other types of stationary or removable computer-readable media, such as removable flash drives, external hard drives, or the like.

Figure 3:
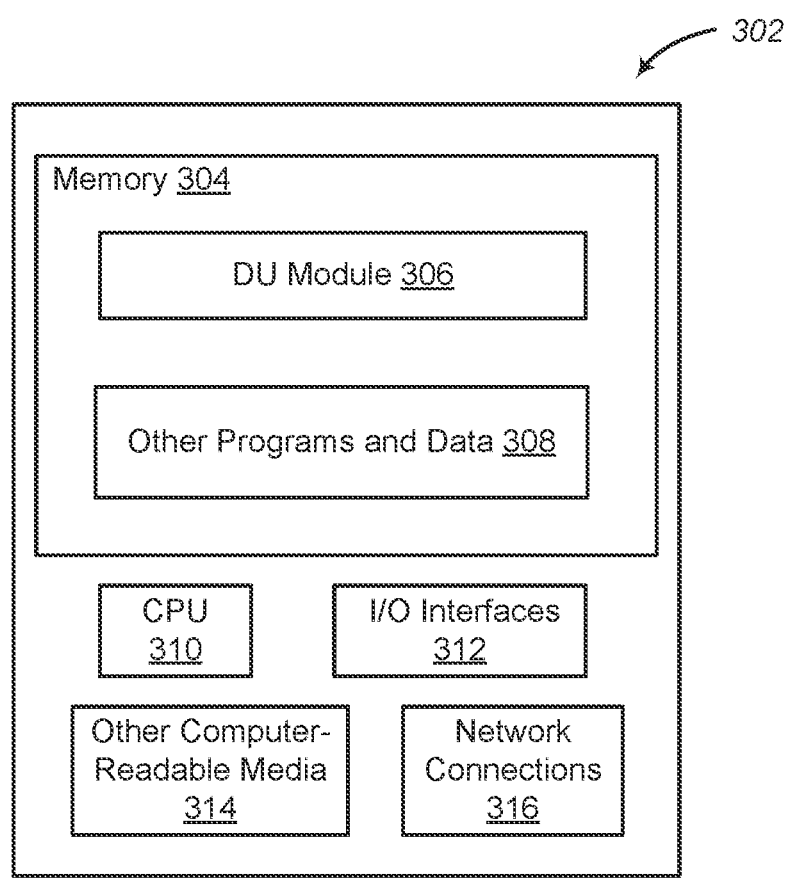
FIG. 3 is a block diagram illustrating a computing device that is configured to operate as a Distributed Unit (DU) device in accordance with embodiments described herein.

FIG. 3 is a block diagram illustrating a computing device that is configured to operate as a Distributed Unit (DU) device in accordance with embodiments described herein. In some embodiments, one or more special-purpose computing systems may be used to implement a Distributed Unit (DU) device 302. Accordingly, various embodiments described herein may be implemented in software, hardware, firmware, or in some combination thereof. The DU device 302 may include one or more memory devices 304, one or more central processing units (CPUs) 310, I/O interfaces 312, other computer-readable media 314, and network connections 316.

The one or more memory devices 304 may include one or more various types of non-volatile and/or volatile storage technologies. Examples of the one or more memory devices 304 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 304 may be utilized to store information, including computer-readable instructions that are utilized by the one or more CPUs 310 to perform actions, including those of embodiments described herein.

The one or more memory devices 304 may have stored thereon a Distributed Unit (DU) module 306. The Distributed Unit (DU) module 306 is configured to implement and/or perform some or all of the functions of the Distributed Unit (DU) 302 described herein. The one or more memory devices 304 may also store other programs and data 308, which may include Fault, Configuration, Accounting, Performance, Security (FCAPS) functions, connection recovery algorithms, connection recovery rules, network protocols, O-RAN operating rules, user interfaces, operating systems, etc. For example, the FCAPS functions include Performance Management (PM), Fault Management (FM), Configuration Management, Certificate Manager (certmgr), and security functions.

Network connections 316 are configured to communicate with other computing devices including the network management device 202, the Cellular Site Router (CSR) device 402, and the Radio Unit (RU) devices 502a to 502. In various embodiments, the network connections 316 include transmitters and receivers, a layer 3 (L2) switch and physical network ports (not illustrated) to send and receive data as described herein, and to send and receive instructions, commands and data to implement the processes described herein. The L2 switch plays a role as Ethernet forwarding/ transparent bridge in order to support Radio Unit (RU) copy and combine function for O-RAN cascade mode. I/O interfaces 312 may include PCI interfaces, PCI-Express interfaces, other data input or output interfaces, or the like. Other computer-readable media 314 may include other types of stationary or removable computer-readable media, such as removable flash drives, external hard drives, or the like.

Figure 4:
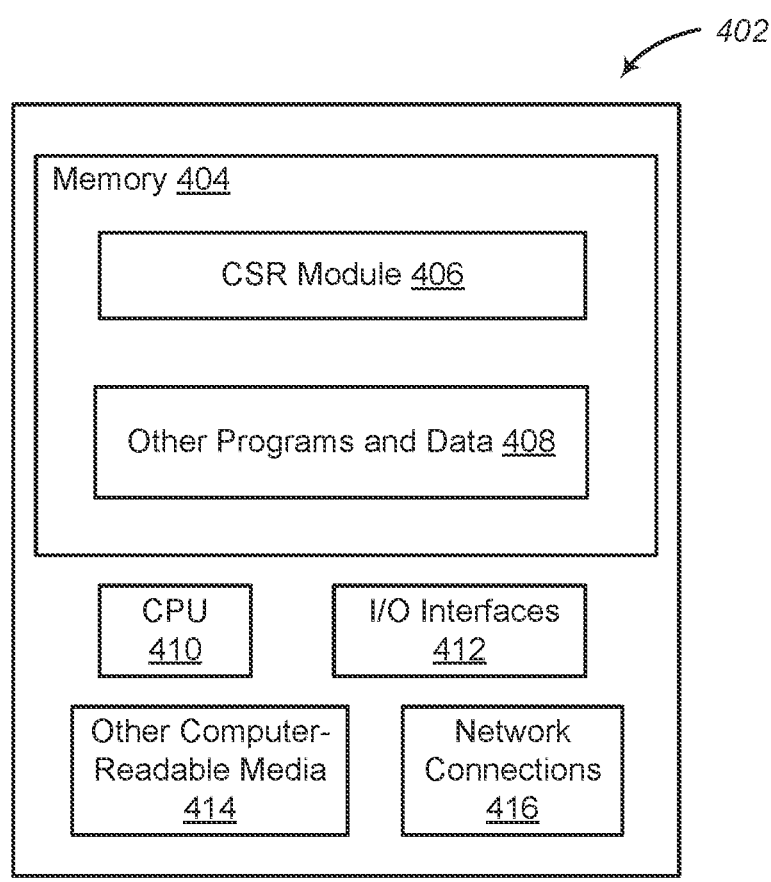
FIG. 4 is a block diagram illustrating an example of a Cellular Site Router (CSR) device in accordance with embodiments described herein.

FIG. 4 is a block diagram illustrating an example of a Cellular Site Router (CSR) device in accordance with embodiments described herein. In some embodiments, one or more special-purpose computing systems may be used to implement a Cellular Site Router (CSR) device 402. Accordingly, various embodiments described herein may be implemented in software, hardware, firmware, or in some combination thereof. The CSR device 402 may include one or more memory devices 404, one or more central processing units (CPUs) 410, I/O interfaces 412, other computer-readable media 414, and network connections 416.

The one or more memory devices 404 may include one or more various types of non-volatile and/or volatile storage technologies. Examples of the one or more memory devices 404 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 404 may be utilized to store information, including computer-readable instructions that are utilized by the one or more CPUs 410 to perform actions, including those of embodiments described herein.

The one or more memory devices 404 may have stored thereon a Cellular Site Router (CSR) module 406. The Cellular Site Router (CSR) is configured to implement and/or perform some or all of the functions of the CSR device 402 described herein. The one or more memory devices 404 may also store other programs and data 408, which may include, connection recovery algorithms, connection recovery rules, network protocols, Quality of Service (QoS) functions, operating systems, etc.

Network connections 416 are configured to communicate with other computing devices including the network management device 202, the computing devices 302-1 to 302-11 that can be configured to operate as Distributed Unit (DU) devices, and the Radio Unit (RU) devices 502a to 502. In various embodiments, the network connections 416 include transmitters and receivers, a layer 4 (L2) switch and physical network ports (not illustrated) to send and receive data as described herein, and to send and receive instructions, commands and data to implement the processes described herein. The L2 switch plays a role as Ethernet forwarding/ transparent bridge in order to support Radio Unit (RU) copy and combine function for O-RAN cascade mode. I/O interfaces 412 may include console ports, an auxiliary (AUX) port, other data input or output interfaces, or the like. Other computer-readable media 414 may include other types of stationary or removable computer-readable media, such as removable flash drives, external hard drives, or the like.

Figure 5:
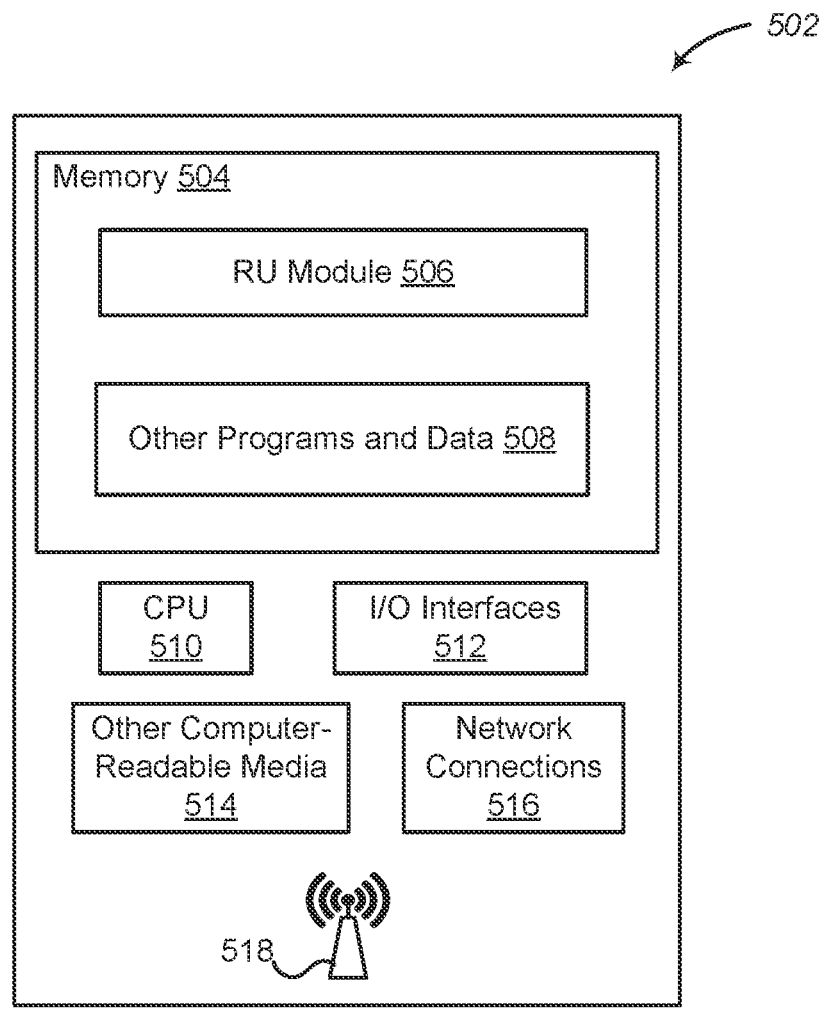
FIG. 5 is a block diagram illustrating an example of a Radio Unit (RU) device in accordance with embodiments described herein.

FIG. 5 is a block diagram illustrating an example of a computing device that is configured to operate as a Radio Unit (RU) device 502 in accordance with embodiments described herein. In some embodiments, one or more special-purpose computing systems may be used to implement the RU device 502. Accordingly, various embodiments described herein may be implemented in software, hardware, firmware, or in some combination thereof. The RU device 502 may include one or more memory devices 504, one or more central processing units (CPUs) 510, I/O interfaces 512, other computer-readable media 514, and network connections 516.

The one or more memory devices 504 may include one or more various types of non-volatile and/or volatile storage technologies. Examples of the one or more memory devices 504 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. The one or more memory devices 504 may be utilized to store information, including computer-readable instructions that are utilized by the one or more CPUs 510 to perform actions, including those of embodiments described herein.

The one or more memory devices 504 may have stored thereon a Radio Unit (RU) module 506. The Radio Unit (RU) module 506 is configured to implement and/or perform some or all of the functions of the RU device 502 described herein and interface with radio transceiver 518. The one or more memory devices 504 may also store other programs and data 508, which may include RU digital certificates, connection recovery algorithms, connection recovery rules, network protocols, O-RAN operating rules, user interfaces, operating systems, etc.

Network connections 516 are configured to communicate with other computing devices including the network management device 202 and a computing device (e.g., computing device 302-1) that is configured to operate as a Distributed Unit (DU). In various embodiments, the network connections 516 include transmitters and receivers, a layer 2 (L2) switch and physical network ports (not illustrated) to send and receive data as described herein, and to send and receive instructions, commands and data to implement the processes described herein. The L2 switch plays a role as Ethernet forwarding/transparent bridge in order to support Radio Unit (RU) copy and combine function for O-RAN cascade mode. I/O interfaces 512 may include enhanced Common Public Radio Interface (eCPRI) ports, Antenna Interface Standards Group (AISG) interfaces, other data input or output interfaces, or the like. Other computer-readable media 514 may include other types of stationary or removable computer-readable media, such as removable flash drives, external hard drives, or the like.

Figure 6:
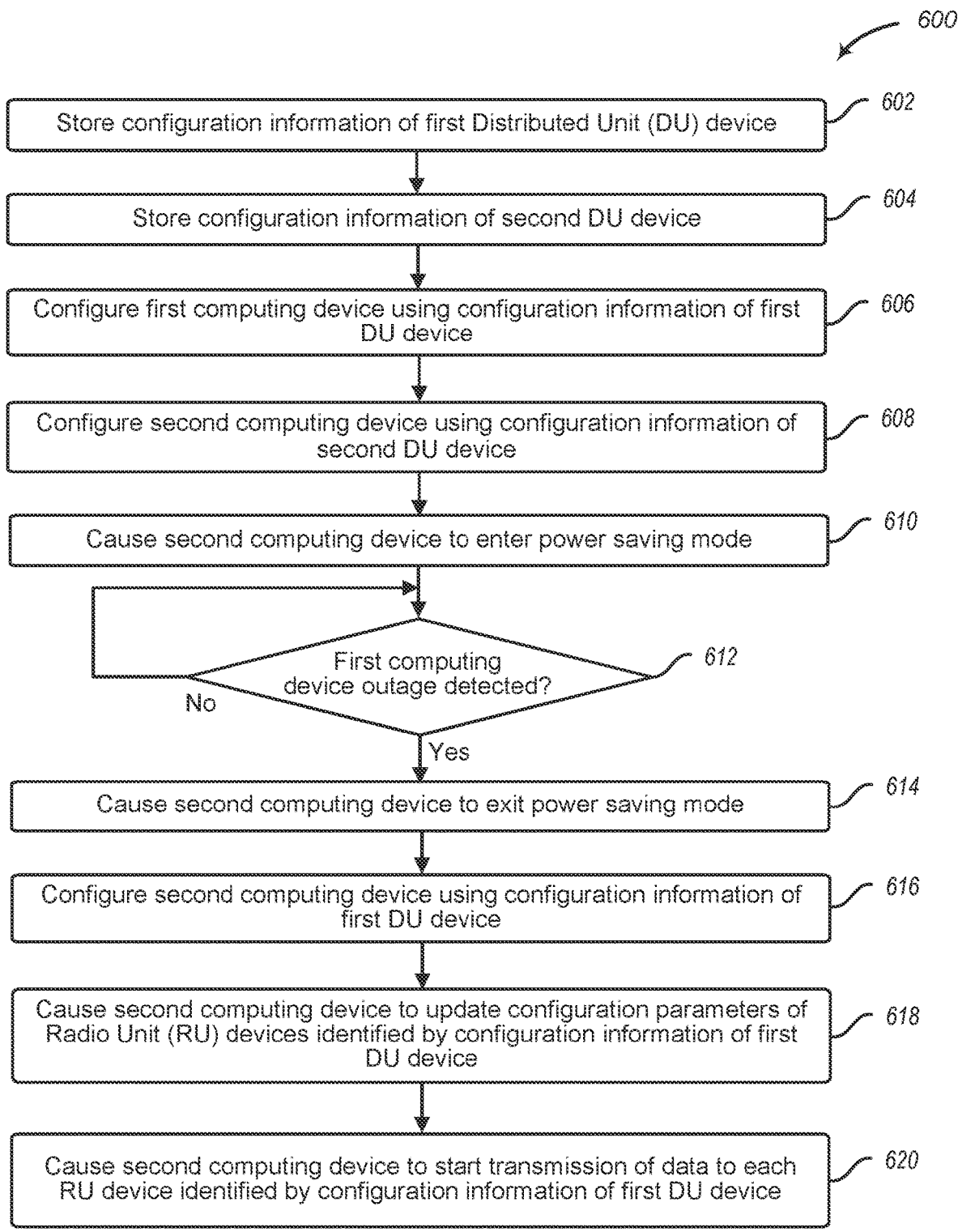
FIG. 6 illustrates a logical flow diagram showing an example of a method of operating a Radio Access Network (RAN) in accordance with embodiments described herein.

FIG. 6 illustrates a logical flow diagram showing an example of a method 600 of operating a Radio Access Network (RAN) in accordance with embodiments described herein. The method 600 begins at 602.

At 602, the network management device 202 stores configuration information of a first Distributed Unit (DU) device. For example, the network management device 202 stores the configuration information of the first DU as a Yet Another Next Generation (YANG) data model in a file formatted using the eXtensible Markup Language (XML), wherein YANG is defined in request for comments (RFC) 7950. The configuration information of the first DU includes information used to configure various communication interfaces, such as F1, E2, and O1 interfaces, for example. The configuration information of the first DU also includes information regarding a plurality of Radio Unit (RU) devices for which the first DU provides network services. For example, the configuration information of the first DU includes an Internet Protocol (IP) address of each of the RU devices for which the first DU provides network services. In one or more implementation, at 602, the network management device 202 causes or requests (e.g., via the Simple Network Monitoring (SNMP) protocol or NETCONF protocol) the configuration information of the first DU from one of the computing devices 302-1 to 302-11 after the computing device is initially configured and tested, and the computing device transmits the configuration information of the first DU to the network management device 202 in response to the request. Additionally or alternatively, the computing device may be configured to periodically transmit the configuration information of the first DU to the network management device 202, and the network management device 202 stores the configuration information of the first DU in response to receiving it from the computing device. The method 600 then proceeds to 604.

At 604, the network management device 202 stores configuration information of a second DU device. For example, the network management device 202 stores the configuration information of the second DU as a YANG data model in a file formatted using XML. The configuration information of the second DU includes information used to configure various communication interfaces, such as F1, E2, and O1 interfaces, for example. In one or more implementation, the configuration information of the second DU is generic configuration information that does not include information regarding any RU devices. The method 600 then proceeds to 606.

At 606, the network management device 202 configures the first computing device using the configuration information of the first DU device stored at 602. For example, executes a script (e.g., Python script) that causes the network management device 202 to establish a Network Configuration (NETCONF) protocol session with the computing device 302-1, transmit the configuration information of the first DU device to the computing device 302-1, and then cause the computing device 302-1 to execute a script that causes the computing device 302-1 to be configured using the configuration information of the first DU device. More particularly, the script may cause the network management device 202 to establish a connection with the computing device 302-1 using the secure shell (SSH) protocol, transmit a Hello message advertising capabilities of the network management device 202 to the computing device 302-1, receive a Hello message advertising capabilities of the computing device 302-1 from the computing device 302-1, transmit the configuration information of the first DU device to the computing device 302-1, and use the remote procedure call (RPC) protocol to request the computing device 302-1 to execute a script that configures the computing device 302-1 using the configuration information of the first DU device. The method 600 then proceeds to 608.

At 608, the network management device 202 configures the second computing device using the configuration information of the second DU device stored at 604. For example, executes a script that causes the network management device 202 to establish a NETCONF protocol session with the computing device 302-11, transmit the configuration information of the second DU device to the computing device 302-11, and then cause the computing device 302-11 to execute a script that causes the computing device 302-11 to be configured using the configuration information of the second DU device, in a manner that is similar to that described in connection with 606. The method 600 then proceeds to 610.

At 610, the network management device 202 causes the second computing device to enter a power saving mode. For example, the network management device 202 transmits a sleep command to the computing device 302-11, which causes the computing device 302-11 to enter the power saving mode. The method 600 then proceeds to 612.

At 612, the network management device 202 determines whether an outage of the first computing device is detected. For example, the network management device 202 determines whether a message has been received (e.g., from Radio Unit (RU) device 502a or the Cellular Site Router (CSR) device 402) indicating that an outage of the computing device 302-1 has been detected. The method 600 then proceeds to 614.

At 614, the network management device 202 causes the second computing device to exit the power saving mode. For example, the network management device 202 transmits a wakeup command to the computing device 302-11, which causes the computing device 302-11 to exit the power saving mode. The method 600 then proceeds to 616.

At 616, the network management device 202 configures the second computing device using the configuration information of the first DU device stored at 602. For example, executes a script that causes the network management device 202 to establish a NETCONF protocol session with the computing device 302-11, transmit the configuration information of the first DU device to the computing device 302-11, and then cause the computing device 302-11 to execute a script that causes the computing device 302-11 to be configured using the configuration information of the first DU device, in a manner that is similar to that described in connection with 618. The method 600 then proceeds to 618.

At 618, the network management device 202 causes the second computing device configured with the configuration information of the first DU device to update a value of a configuration parameter (e.g., indicating a default route or address to use when forwarding data received via the radio transceiver 518 to the network connections 516) stored by RU devices identified by the configuration information of the first DU device, from an address of the first computing device to an address of the second computing device. In one or more implementations, the network management device 202 executes a script that causes the network management device 202 to establish a connection with the computing device 302-1 using the SSH protocol, transmit a Hello message advertising capabilities of the network management device 202 to the computing device 302-11, receive a Hello message advertising capabilities of the computing device 302-11 from the computing device 302-11, transmit a script to the computing device 302-11 that causes the computing device 302-11 to establish a NETCONF protocol session with each of the RU devices identified by the configuration information of the first DU device and modify the value of the configuration parameter stored by each of RU devices from an address of the computing device 302-1 to an address of the computing device 302-11, and use the RPC protocol to request the computing device 302-11 execute the script. The method 600 then proceeds to 620.

At 620, the network management device 202 causes the second computing device to start transmission of data to each of the RU devices identified by the configuration information of the first DU device. In one or more implementations, the network management device 202 instructs the second computing device (e.g., computing device 302-11) to initiate U-Plane configuration to each of the first radio unit devices (e.g., RU devices 502a to 502n), and starts sending data to and receiving data from each of the first radio unit devices (e.g., RU devices 502a to 502n). For example, the second computing device (e.g., computing device 302-11) uses a Fronthaul CUSM-Plane via the fronthaul interface network 150 to initiate the U-Plane configuration to each of the RU devices. The method 600 then ends.

Figure 7:
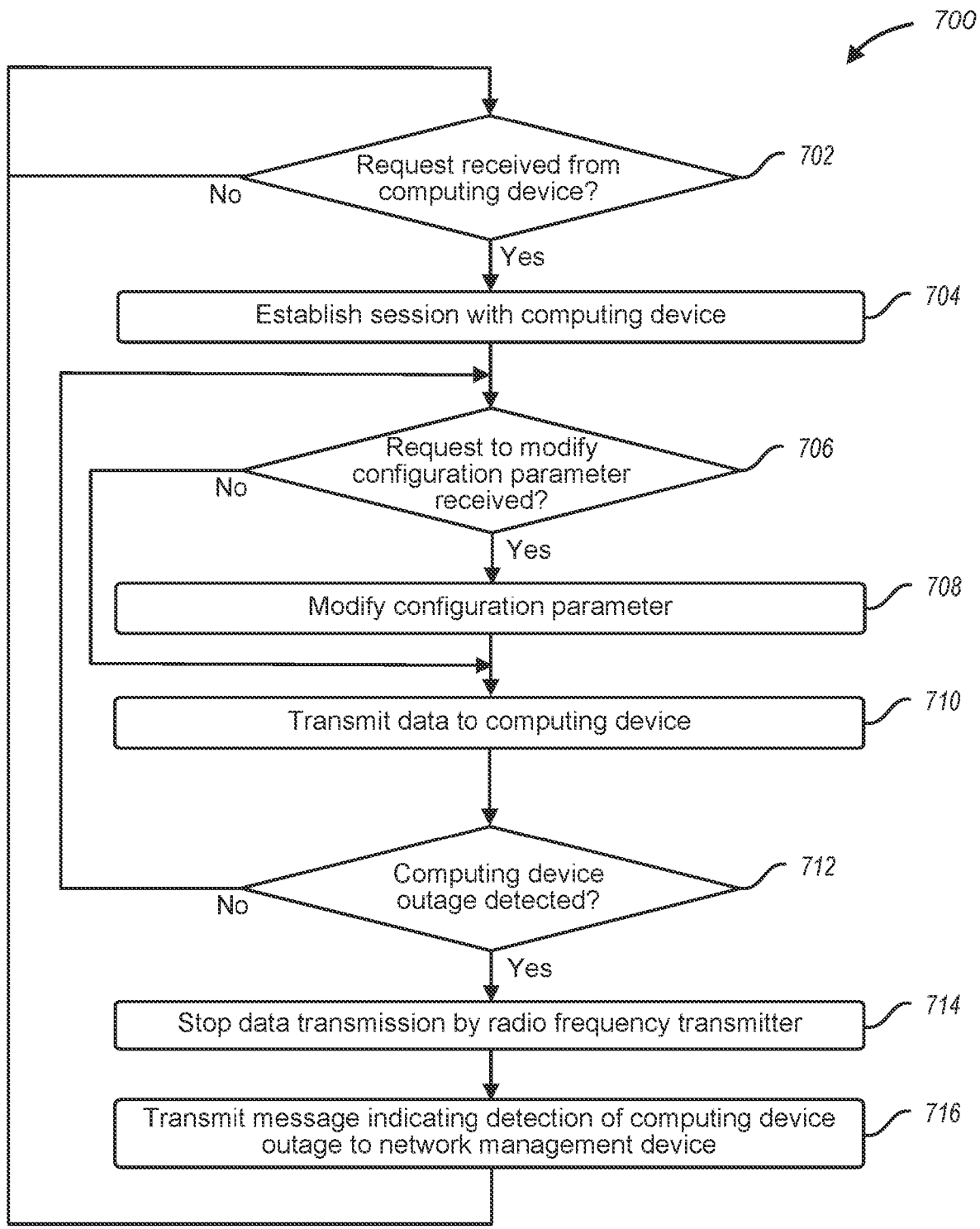
FIG. 7 illustrates a logical flow diagram showing an example of a method of operating a Radio Access Network (RAN) in accordance with embodiments described herein.

FIG. 7 illustrates a logical flow diagram showing an example of a method 700 of operating a Radio Access Network (RAN) in accordance with embodiments described herein. Although the method 700 is described below as being performed by a Radio Unit (RU) device (e.g., RU device 502a), the method 700 may be performed by a Cellular Site Router (CSR) device (e.g., CSR device 402) without departing from the scope of the present disclosure. The method 700 begins at 702.

At 702, a RU device determines whether a request has been received from a computing device. For example, the RU device 502a determines whether a SSH connection request has been received from the computing device 302-1. If the RU device determines "No" a request has not been received from the computing device, the method 700 returns to 702. If the RU device determines "Yes" a request has been received from the computing device, the method 700 proceeds to 704.

At 704, the RU device establishes a session with the computing device. For example, the RU device 502a establishes a SSH connection requested by the SSH connection request received at 702, and then transmits a Hello message advertising capabilities of the RU device 502a to the computing device 302-1, in order to establish a NETCONF protocol session. The method 700 then proceeds to 706.

At 706, the RU device determines whether a request to modify a configuration parameter is received. For example, the RU device 502a determines whether a NETCONF message including an <edit-config> tag has been received from the computing device 302-1. If the RU device determines "No" a request to modify a configuration parameter has not been received, the method 700 proceeds to 710. If the RU device determines "Yes" a request to modify a configuration parameter has been received, the method 700 proceeds to 708.

At 708, the RU device modifies the configuration parameter in response to the request received at 706. For example, the RU device 502a modifies the value of a configuration parameter that is stored in its one or more memory devices 504 and that indicates an IP address of a default route that the RU device 502a uses to route traffic received via its radio transceiver 518 to its Network Connections 516. The method 700 then proceeds to 710.

At 710, the RU device transmits data to a computing device using the configuration parameter that is modified at 708. For example, the RU device 502a receives the data from a cellular telephone via its radio transceiver 518, and retransmits the data to the computing device 302-1 via the Cellular Site Router (CSR) device 402 using the configuration parameter indicating the default route. The method 700 then proceeds to 712.

At 712, the RU device determines whether an outage of a computing device is detected. For example, the RU device 502a determines whether a watchdog timer that is reset by the computing device 302-1 during a NETCONF protocol session has expired. If the RU device 502a determines that the watchdog timer has expired, the RU device 502a determines that an outage of the computing device 302-1 is detected. If the RU device 502a determines that the watchdog timer has not expired, the RU device 502a determines that an outage of the computing device 302-1 is not detected. If the RU device determines "No" an outage of a computing device is not detected, the method 700 returns to 706. If the RU device determines "Yes" an outage of a computing device is detected, the method 700 proceeds to 714.

At 714, the RU device stops data transmission by a radio frequency transmitter in response to determining that an outage of a computing device is detected at 712. For example, the RU device 502a stops data transmission via its radio transceiver 518. The method 700 then proceeds to 716.

At 716, the RU device transmits a message indicating detection of a computing device outage to a network management device. For example, the RU device 502a transmits a message including a first field that includes a predefined code indicating that it is a type of message that indicates an outage of a computing device, and a second field that includes an identifier (e.g., IP address) of the computing device 302-1 to the network management device 202. The method 700 then ends.

FIGS. 8A to 8C are diagrams for explaining an example of operating a Radio Access Network (RAN) in accordance with embodiments described herein.

FIG. 8A illustrates initial roles of each of the computing devices 302-1 to 302-11, before the method 600 shown in FIG. 6 and the method 700 shown in FIG. 7 are performed. Although the network system 100 includes only one computing device (e.g., 302-11) that is currently configured to function as a dynamic standby DU device, as indicated by the designation DU-STANDBY, one skilled in the art will appreciate that multiple computing devices could be used as dynamic standby DU devices to provide additional redundancy in order to remedy multiple, simultaneous computing device outages.

In FIG. 8A, the computing device 302-1 is an operational device configured with first Distributed Unit (DU) configuration information DU #1, the computing device 302-2 is an operational device that is configured with second DU configuration information DU #2, the computing device 302-3 is an operational device that is configured with third DU configuration information DU #3, the computing device 302-4 is an operational device that is configured with fourth DU configuration information DU #4, the computing device 302-5 is an operational device that is configured with fifth DU configuration information DU #5, the computing device 302-6 is an operational device that is configured with sixth DU configuration information DU #6, the computing device 302-7 is an operational device that is configured with seventh DU configuration information DU #7, the computing device 302-8 is an operational device that is configured with eighth DU configuration information DU #8, the computing device 302-9 is an operational device that is configured with ninth DU configuration information DU #9, the computing device 302-10 is an operational device that is configured with tenth DU configuration information DU #10, and the computing device 302-11 is a dynamic standby DU device that is configured with generic DU configuration information, as indicated by the designation DU-STANDBY.

FIG. 8B illustrates roles of each of the computing devices 302-1 to 302-11, after the method 600 shown in FIG. 6 and the method 700 shown in FIG. 7 are performed. More particularly, in FIG. 8B, an outage of the computing device 302-1 has been detected at 612 of the method 600 shown in FIG. 6, and the computing device 302-11 has been instructed to start transmission of data to RU devices identified by the configuration information of first DU device at 620 of the method 600 shown in FIG. 6. Thus, the computing device 302-1 is designated as OUTAGE, and the computing device 302-11 is designated as DU #1.

FIG. 8C illustrates roles of each of the computing devices 302-1 to 302-11, after the computing device 302-1 is repaired or replaced. The computing device 302-1 is now a dynamic standby DU that may be configured with the generic DU configuration information, as indicated by the designation DU-STANDBY. Accordingly, the computing device 302-1 is available to dynamically replicate the functionality of the computing devices 302-2 to 302-11 if one of those devices has an outage.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a Radio Access Network (RAN) including a radio unit device, a first computing device, and a second computing device different from the first computing device, the method comprising:

storing, by a network management device, first Distributed Unit (DU) configuration information;

configuring, by the network management device, the first computing device using the first DU configuration information;

detecting, by the network management device, an outage of the first computing device;

configuring, by the network management device, the second computing device using the first DU configuration information in response to the detecting the outage of the first computing device;

causing, by the network management device, the second computing device to update a configuration parameter stored by the radio unit device using an address of the radio unit device included in the first DU configuration information;

establishing, by the network management device, a first Network Configuration (NETCONF) protocol session with the second computing device;

configuring, by the network management device, the second computing device using second DU configuration information different from the first DU configuration information during the first NETCONF protocol session; and establishing, by the network management device, a second NETCONF protocol session with the first computing device, wherein the configuring the first computing device using the first DU configuration information is performed during the second NETCONF protocol session.

2. The method according to claim 1, wherein the detecting the outage of the first computing device includes receiving a message from the radio unit device.

3. The method according to claim 1, further comprising:
storing, by the network management device, the second DU configuration information different from the first DU configuration information; and
wherein the configuring, by the network management device, the second computing device using the second DU configuration information is performed before the configuring the second computing device using the first DU configuration information.

4. The method according to claim 3, further comprising:
causing, by the network management device, the second computing device to enter a power saving mode after the configuring the second computing device using the second DU configuration information; and
causing, by the network management device, the second computing device to exit the power saving mode before the configuring the second computing device using the first DU configuration information.

5. The method according to claim 1, further comprising:
receiving, by the network management device, the first DU configuration information from the first computing device.

6. The method according to claim 5, further comprising:
causing, by the network management device, the first computing device to transmit the first DU configuration information to the network management device.

7. A network management system that manages a Radio Access Network (RAN) including a radio unit device, a first computing device, and a second computing device different from the first computing device, the network management system comprising:
one or more processors; and
one or more storage devices storing instructions that, when executed by the one or more processors, cause the network management system to:
configure the first computing device using first Distributed Unit (DU) configuration information;
detect an outage of the first computing device;
configure the second computing device using the first DU configuration information in response to the detecting the outage of the first computing device;
cause the second computing device to update a configuration parameter stored by the radio unit device using an address of the radio unit device included in the first DU configuration information;
establish a first Network Configuration (NETCONF) protocol session with the second computing device;
configure the second computing device using second DU configuration information different from the first DU configuration information during the first NETCONF protocol session; and
establish a second NETCONF protocol session with the first computing device, wherein the first computing device is configured using the first DU configuration information during the second NETCONF protocol session.

8. The system according to claim 7, wherein the instructions stored by the one or more storage devices, when executed by the one or more processors, cause the network management system to cause the first computing device to detect the outage of the first computing device in response to receiving a message from the radio unit device.

9. A network management system that manages a Radio Access Network (RAN) including a radio unit device, a first computing device, and a second computing device different from the first computing device, the network management system comprising:
one or more processors; and
one or more storage devices storing instructions that, when executed by the one or more processors, cause the network management system to:
configure the first computing device using first Distributed Unit (DU) configuration information;
detect an outage of the first computing device;
configure the second computing device using the first DU configuration information in response to the detecting the outage of the first computing device;
cause the second computing device to update a configuration parameter stored by the radio unit device using an address of the radio unit device included in the first DU configuration information;
configure the second computing device using second DU configuration information different from the first DU configuration information before the second computing device is configured using the first DU configuration information;
cause the second computing device to enter a power saving mode after the second computing device is configured using the second DU configuration information; and
cause the second computing device to exit the power saving mode before the second computing device is configured using the first DU configuration information.

10. The system according to claim 7, wherein the instructions stored by the one or more storage devices, when executed by the one or more processors, cause the network management system to:
receive the first DU configuration information from the first computing device.

11. The system according to claim 7, wherein the instructions stored by the one or more storage devices, when executed by the one or more processors, cause the network management system to:
cause the first computing device to transmit the first DU configuration information to the network management system.

* * * * *